Figure 1:
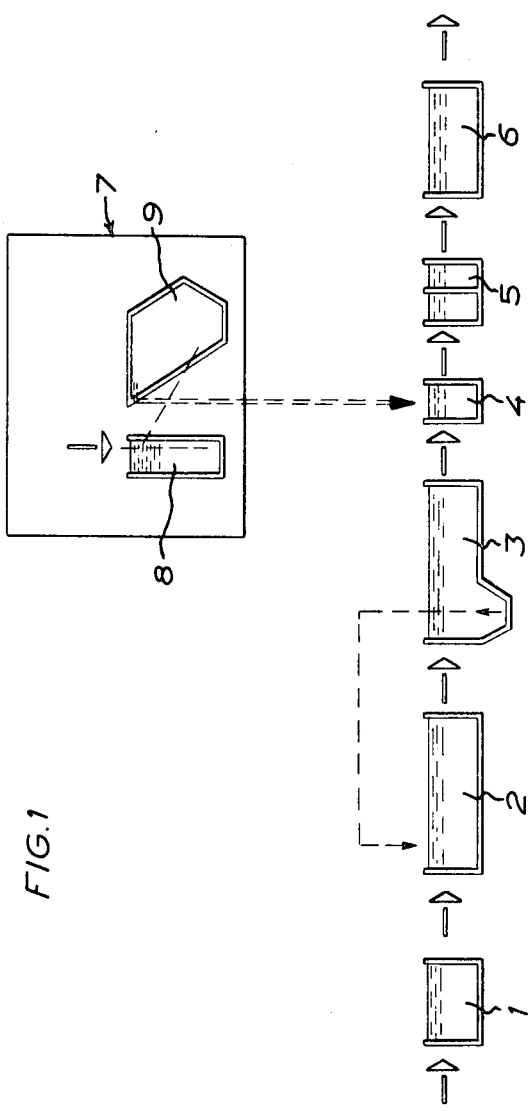

United States Patent [19]

Henrikson

[11] 4,110,211

[45] Aug. 29, 1978

[54] PROCESS FOR THE PREPARATION OF A SUBSTANTIALLY HOMOGENEOUS LIME WATER SOLUTION

[76] Inventor: Stig Arvid Henrikson, 103 Grönviksvagen S-161, 40 Bromma, Sweden

[21] Appl. No.: 813,773

[22] Filed: Jul. 7, 1977

[51] Int. Cl.² .................. B01D 21/02; C02B 1/20
[52] U.S. Cl. .................. 210/47; 210/83; 252/175; 423/164; 423/640
[58] Field of Search .......... 210/42 R, 45, 46, 47, 210/83, 84, 192, 521; 423/164, 640; 252/61, 175; 209/5, 155, 157, 158, 484, 485, 506

[56] References Cited

U.S. PATENT DOCUMENTS

| 653,740 | 7/1900 | Jewell | 210/47 |
|---|---|---|---|
| 1,566,587 | 12/1925 | Evans | 423/640 |
| 2,694,000 | 11/1954 | Azbe | 210/521 |
| 2,904,401 | 9/1959 | Booth | 423/640 |
| 3,347,786 | 10/1967 | Baer | 210/47 |
| 3,494,475 | 2/1970 | Hedstrom | 210/521 |
| 3,862,033 | 1/1975 | Rozkydalek | 210/84 |
| 3,944,486 | 3/1976 | Kwon | 423/164 |

FOREIGN PATENT DOCUMENTS 12,941 of 1893 United Kingdom ............ 210/47

Primary Examiner—Charles N. Hart
Assistant Examiner—Ernest G. Therkorn
Attorney, Agent, or Firm—Wenderoth, Lind & Ponack

[57] ABSTRACT

In the preparation of homogeneous lime water solution for use in the purification of waste water, a lime water suspension is used as starting material. The lime water suspension is supplied at the bottom of a compartment in which it is caused to rise in order to leave at the upper part, while passing lamellas during its upward movement. The lamellas are arranged in such a way that they will create a sludge zone at their lower part in the compartment, in which zone the rising lime suspension is filtered, whereas they create at their upper part in the compartment a clarification zone in which fine particles are separated.

5 Claims, 3 Drawing Figures

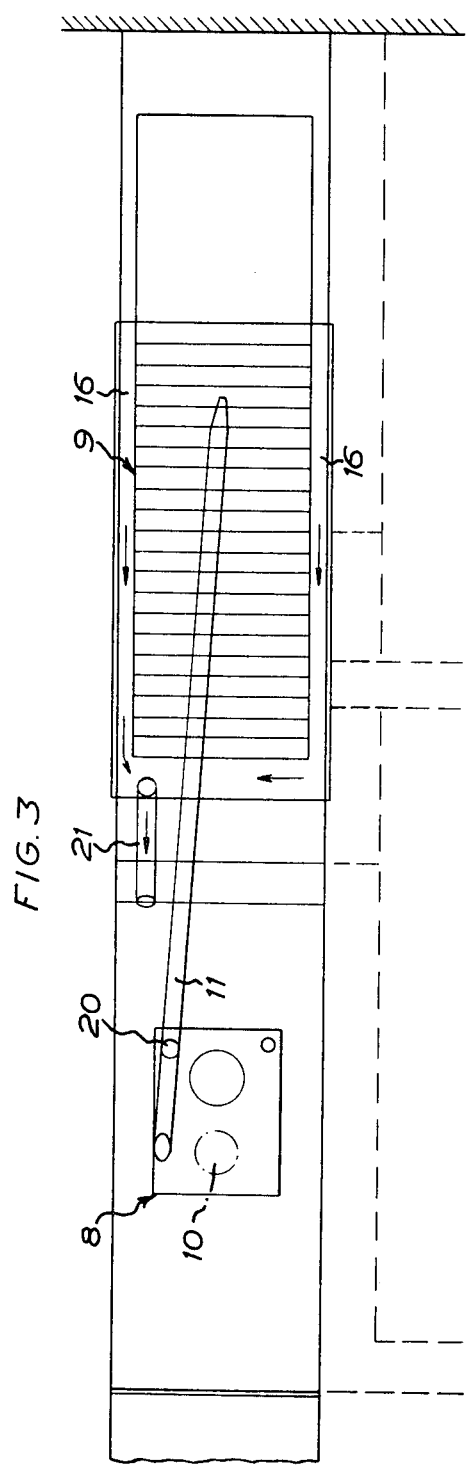

PROCESS FOR THE PREPARATION OF A SUBSTANTIALLY HOMOGENEOUS LIME WATER SOLUTION

The present invention relates to a process for the preparation of a substantially homogeneous lime water solution intended for use in the purification of waste water and the like liquids, the starting material for the homogeneous lime water solution consisting of a lime suspension. Characteristic of this process is that the lime suspension is introduced at the bottom of a compartment in which it is caused to rise in order to leave at the top thereof, said lime suspension during its upward flow being caused to pass lamellas which create a sludge zone at their lower end in the compartment, in which zone the rising lime suspesion is filtered, while said lamellas create at their upper end in the compartment a clarification zone in which fine particles are separated. By means of this invention there is obtained a lime water preparation which, on one hand, makes complete use of the flocculating properties of the lime so that only a minimum amount of lime will have to be supplied to achieve optimum flocculation and, on the other hand, prevents inconvenient carbonate-formation, etc., which would produce deposits on machine equipments, tanks, conduits and pipes. There is also gained the advantage that the rest content of calcareous small particles in the effluent purified water will be very small.

Figure 2:
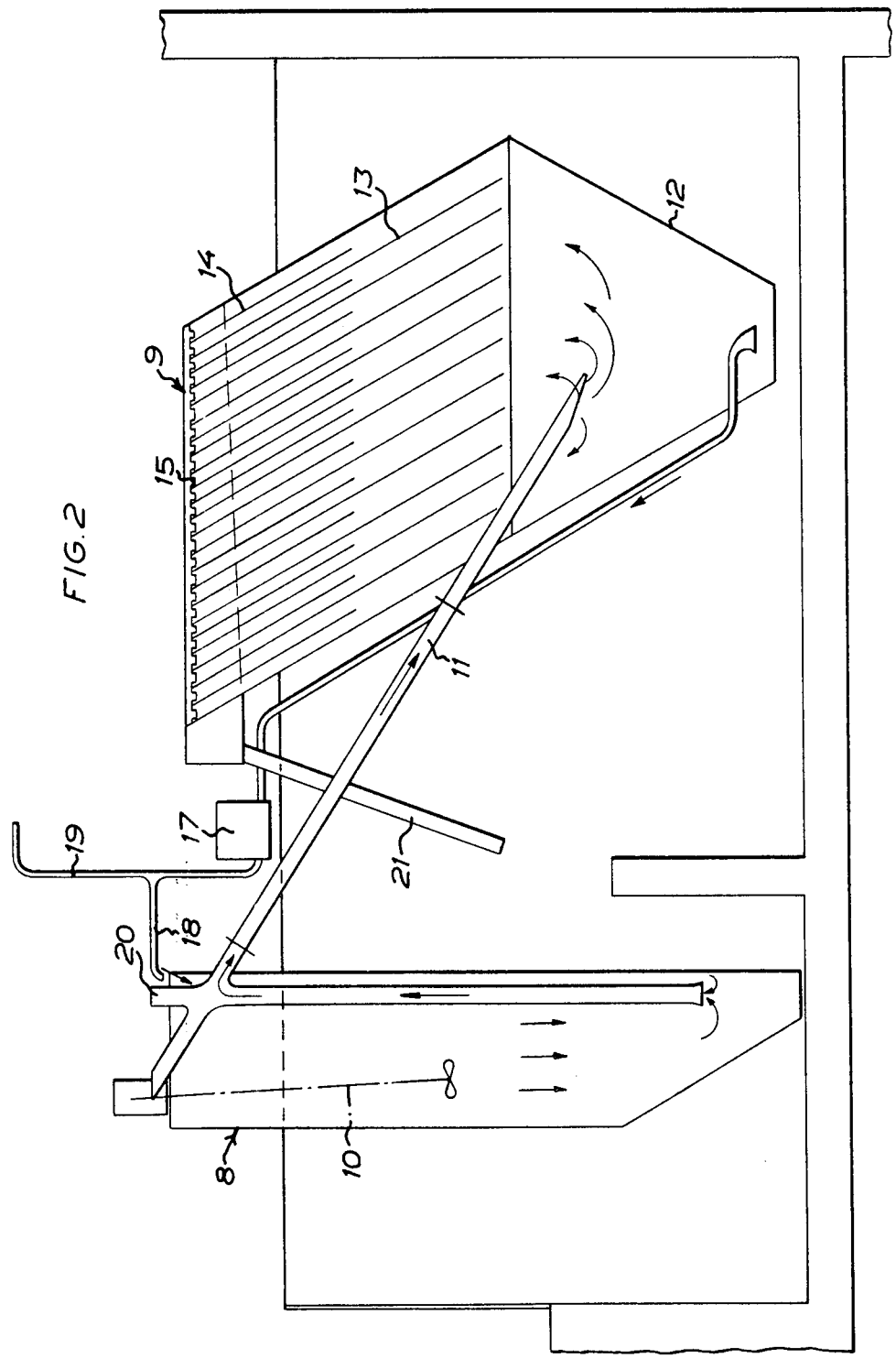

The invention will be more fully described hereinbelow with reference to the accompanying drawings which illustrate the apparatus for carrying out the process and in which:

FIG. 2 schematically shows a complete purification plant including the apparatus for carrying out the process;

FIG. 2 shows in greater detail and on a larger scale a section of the apparatus of the invention, i.e. a limewater preparing apparatus; and FIG. 3 is a plan view of the same apparatus.

The purification plant according to FIG. 1 comprises six series-connected tanks 1–6 which, in turn, are passed by the water being purified. The tank 1 includes a sand trap and a machine-cleaned screen. The tank 2 is an aeration tank to which active sludge is added. The tank 3 is an intermediary-sedimentation tank. To the tank 4 there is supplied the lime water solution obtained by the process of the present invention, in which the lime water solution has been prepared by the apparatus designated 7. Reference numerals 5 and 6 designate respectively a flocculation tank and a flotation tank from which latter the purified water issues. The purification plant may of course be modified in various ways without affecting the process of the present invention.

The apparatus 7 comprises the lime dissolving means 8 and the lime water preparing means 9. The lime dissolving means 8 includes a dissolving vessel for dissolving dry, slaked or quick lime. In this vessel a stirring means 10 mixes the lime into the added dissolving water. As dissolving water there may be used the effluent purified waste water having a pH of 10–12, biologically purified waste water or tap water. The amount of dissolving water is to be about one liter water per 1.7 g lime.

From the dissolving vessel 8 the lime suspension is allowed to flow to the lime water preparing means 9 into which it passes through the pipe 11 and enters centrally at the bottom of a conical compartment 12 serving as a lime sludge hopper. From this compartment the lime suspension flows upwardly while passing a number of lamellas 13 and 14, where-upon it flows away on either side of a spillway crest 15 to grooves 16.

The lamellas 13 and 14 are of varying length. In the case shown in the drawings every second lamella 13 is long whereas intermediate lamellas 14 are short. Thus, the lamellas 13 and 2 m long and spaced from each other by a distance of 15 cm, while the lamellas 14 are only 1 m long but equally spaced by a distance of 15 cm.

The zone covered by the long lamellas 13 alone, i.e. the lower half of the pack of lamellas, has been dimensioned so as to form a stationary sludge zone in this area. The upwardly flowing lime suspension is filtered by this sludge zone. The lamella area which is situated above said sludge zone and has a double number of lamellas 13 and 14 forms a clarification zone where fine particles are separated as the lime water flows upwardly.

The sludge zone for the rising lime suspension is formed because the surface load on the lamellas 13 is substantially higher at the lower part than is the surface load on the lamellas 13 and 14 at the upper part forming the clarification zone. Thus, the surface load on the lamellas 13 at the lower part forming the sludge zone is about twice the surface load on the lamellas 13 and 14 at the upper part forming the clarification zone. The surface load on the lamellas 13 at the lower part forming the sludge zone should preferably be about 2.5 $m^3/m^2/h$, while the surface load on the lamellas 13 and 14 at the upper part forming the clarification zone should preferably be about 1.25 $m^3/m^2/h$. The surface load is calculated on the basis of the projected surface of the lamellas.

The sludge, which runs along the lamellas and is collected in the bottom cone 12, has a density which is about 10–15 times that of the sludge water in the sludge zone and it occupies about a tenth of the space between the lamellas 13. The lime sludge collected in the bottom cone 12 is partially recycled by pumping to the lime dissolving vessel 8 while remaining lime sludge runs off by gravity to the units before the point of addition of lime water to the waste water (for instance the pre-treatment apparatus) at the waste water treatment plant. The volume of lime sludge recycled to the dissolving vessel 8 must be practically determined in every particular case, depending int. alia on the amount of sand and impurities in the lime used. Reference numeral 17 designates the lime sludge pump which returns lime through the pipe 18 to the lime dissolving vessel 8 and which returns lime through the pipe 19 to the pre-treatment apparatus.

The dosage of lime takes place at 20 and the dosage of lime water solution to the waste water takes place at 21.

The invention is not restricted to the embodiments described above and shown in the drawings but may be modified within the spirit and scope of the appended claims.

What I claim and desire to secure by Letters Patent is:

1. A process for the preparation of a substantially homogeneous lime water solution intended for use in the purification of waste water and like liquids, the starting material for the homogeneous lime water solution consisting of a lime suspension, comprising introducing the lime suspension at the bottom of a compartment in which it is caused to rise in order to leave at the top thereof, said lime suspension during its upward flow being caused to pass lamellas which create a sludge zone at their lower end in the compartment, in which zone the rising lime suspension is filtered, while said lamellas create at their upper end in the compartment a clarification zone in which fine particles are separated.

2. A process as claimed in claim 1, wherein the sludge zone for the rising lime suspension is obtained in that the surface load on the lamellas is substantially higher at the lower part than is the surface load on the lamellas at the upper part forming the clarification zone.

3. A process as claimed in claim 2, wherein the surface load on the lamellas at the lower part forming the sludge zone is about twice the surface load on the lamellas at the upper part forming the clarification zone.

4. A process as claimed in claim 3, wherein the surface load on the lamellas at the lower part forming the sludge zone is about 2.5 $m^3/m^2/h$ while the surface load on the lamellas at the upper part forming the clarification zone is about 1.25 $m^3/m^2/h$.

5. A process as claimed in claim 1, wherein the lime sludge which flows away from the lamellas and sinks to the bottom of the compartment is wholly or partly recycled to be incorporated with the lime suspension serving as starting material.

* * * * *